United States Patent
Buford et al.

(10) Patent No.: US 8,380,202 B2
(45) Date of Patent: *Feb. 19, 2013

(54) METHOD FOR REGISTERING COMMUNICATION TERMINALS WITH BASE STATION DEVICES BY USING VIRTUAL APPLIANCES

(75) Inventors: John Buford, Princeton, NJ (US); Mehmet C. Balasaygun, Freehold, NJ (US); Xiaotao Wu, Metuchen, NJ (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,113

(22) Filed: Jul. 31, 2012

(65) Prior Publication Data
US 2012/0302236 A1   Nov. 29, 2012

Related U.S. Application Data

(62) Division of application No. 12/814,771, filed on Jun. 14, 2010, now Pat. No. 8,233,903.

(51) Int. Cl.
*H04W 88/02* (2009.01)
(52) U.S. Cl. ........................................................ 455/436
(58) Field of Classification Search ............... 455/435.1, 455/436
See application file for complete search history.

(56) References Cited

U.S. PATENT DOCUMENTS

| | | | |
|---|---|---|---|
| 2007/0053513 A1* | 3/2007 | Hoffberg | 380/201 |
| 2007/0078714 A1 | 4/2007 | Ott et al. | |
| 2011/0296370 A1* | 12/2011 | Ferris et al. | 717/100 |
| 2012/0226742 A1* | 9/2012 | Momchilov et al. | 709/203 |

* cited by examiner

*Primary Examiner* — Diane Mizrahi

(57) ABSTRACT

A method for the registration of a communication terminal is provided. In some embodiments of the present invention, a communication terminal is registered with a base station by searching and executing a virtual appliance that contains base station software with which the communication terminal pre-subscribed. In some embodiments of the present invention, a communication terminal is registered as an endpoint device for a Session Initiation Protocol (SIP) uniform resource identifier (URI) when the communication terminal registers with the base station.

20 Claims, 9 Drawing Sheets

METHOD FOR REGISTERING COMMUNICATION TERMINALS WITH BASE STATION DEVICES BY USING VIRTUAL APPLIANCES

PRIORITY INFORMATION

The present application is a divisional of U.S. patent application Ser. No. 12/814,771, filed Jun. 14, 2010, the content of which is incorporated herein by reference in its entirety.

FIELD OF THE INVENTION

The present invention relates to telecommunications in general, and, more particularly, to a method for registering communication terminals with base station devices.

BACKGROUND OF THE INVENTION

A cordless telephone is a telephone that communicates via radio waves with a base station connected to a fixed telephone line. The base station is located in the subscriber's premises and attaches to the telephone line in the same way a regular wired telephone receiver does. When a person uses a cordless telephone, he or she can take the handset and go anywhere in his or her house without being constrained by a wire. Cordless telephones have been manufactured since the 1980s.

Digital Enhanced Cordless Telecommunications (DECT) is a standard specification for cordless telephone receivers. DECT fully specifies the means for a cordless handset to access a fixed network via radio. It specifies, signal frequencies to be used as well as protocols for communication between handsets and base station devices. The first DECT standard was published in 1991.

The rapid development of the Internet throughout the 1990s saw the development of another standard. The Cordless Advanced Technology—Internet and quality (CAT-iq) standard was specified to bring together broadband Internet and telephony. CAT-iq is intended to coexist with DECT.

CAT-iq specifies the means for delivery of additional services on DECT-compliant handsets. CAT-iq handsets can make both calls over the telephone network (PSTN) and calls over the Internet (e.g., VoIP, etc.). Furthermore, CAT-iq handsets have the ability to receive data services, such as Internet radio, for example. CAT-iq is an enhancement to the DECT standard because it enables the delivery of advanced services that are not available in DECT.

DECT and CAT-iq are designed to promote interoperability. Devices that implement the DECT/CAT-iq standards are expected to be compatible with one another regardless of their implementation details. From a practical standpoint that means that a user can buy a handset from one manufacturer and expect it to interact successfully with any other manufacturer's base station device.

SUMMARY OF THE INVENTION

Notwithstanding interoperability goals, the extent to which DECT/CAT-iq devices can interact with each other varies. DECT and CAT-iq are standard specifications that specify the implementation of different services. The actual implementation of these services is completed by the manufacturers of DECT/CAT-iq devices. Variations in the implementations of different manufacturers sometimes cause devices to experience difficulties when interacting with one another.

The software implementation of the DECT/CAT-iq standards is sometimes referred to as DECT/CAT-iq stack. A DECT/CAT-iq is an application programming interface (API) for implementing services. For the purposes of this disclosure, the term "service" is a communication functionality that can be made available to a communication terminal. Exemplary services include voice mail control, voice service capability (e.g., PSTN telephone calls), data service (e.g. Internet access), voice over Internet Protocol (VoIP), and others.

In a DECT/CAT-iq system comprising a base station and a handset, each of the two devices executes its own DECT/CAT-iq stack. The number of different services implemented by each stack can vary. For example, the manufacturer of a base station may implement only a voice telephony service, while the manufacturer of a cordless device may implement both the voice telephony and answering machine control services. In this scenario, when the cordless device is coupled with the base station, the cordless device would be able to use only the voice telephony service (i.e., the device would be able to make telephone calls, etc.).

In order for a service to be available to the user, the DECT/CAT-iq stacks of the base station and the user's handset must both implement that service. Therefore, to maximize the number of services that a user can access on his or her DECT/CAT-iq handset, a base station device that executes a DECT/CAT-iq stack possessing a desirable characteristic has to be selected. Desirable characteristics include, but are not limited to, availability of a certain service (i.e., the stack of the base station implements the service), support for a specific version of a standard specification (e.g., DECT/CAT-iq v. 4.0, etc.), and having the same manufacturer as the handset.

The present invention uses virtualization to address compatibility issues that are caused by variations in the implementation of different DECT/CAT-iq stacks. Virtualization is a technology that enables the execution of multiple system software instances on a hardware device. Virtualization makes possible the use of virtual appliances. Virtual appliances are software packages that are designed to run on a virtualization platform. Virtual appliances comprise system software services as well as higher-level applications such as base station software, for example. The use of virtual appliances reduces the installation, configuration, and maintenance costs associated with deploying software stacks such as the DECT/CAT-iq stacks discussed.

In some embodiments, a virtual appliance is selected and started when a DECT/CAT-iq terminal registers with a DECT/CAT-iq base station. The virtual appliance comprises base station software. The base station software comprises a DECT/CAT-iq stack that possesses a desirable characteristic. Desirable characteristics include, but are not limited to, availability of a certain service (i.e., the stack implements the service), support for a specific version of a standard specification (e.g., DECT/CAT-iq v. 4.0, etc.), and having the same manufacturer as the handset. Thus, when a CAT-iq terminal registers with a base station, the present invention locates and downloads a virtual appliance that comprises a DECT/CAT-iq stack that is deemed desirable for the registering terminal.

The present invention also uses virtualization to improve the way in which terminals subscribe to base stations. In some embodiments, a virtual appliance is selected and started when a DECT/CAT-iq handset registers with a DECT/CAT-iq base station. The virtual appliance comprises base station software. The base station software is configured so that the terminal is pre-subscribed with the base station software. Because the terminal is pre-subscribed, both the terminal and the base station need not execute a registration handshake to exchange registration information. For the purposes of this disclosure, the term "registration information" is information that at least one of a base station and a terminal must possess in order to recognize and/or communicate with each other. Examples of registration information items, which are discussed in the Detailed Description section, include subscribed-device identifier, service identifier, and service identity.

Furthermore, in some embodiments, the present invention improves the ease with which terminal devices take advantage of VoIP telephony services provided by the CAT-iq standard. In some of these embodiments, the present invention registers terminals as endpoint devices in a Session Initiation Protocol (SIP) network when the devices register with a base station. In particular, the embodiments identify a SIP uniform resource identifier (URI) associated with a terminal or the user of the terminal. After the SIP URI is identified, the embodiments register the terminal as an endpoint device for the SIP URI.

Although the present invention and its embodiments are discussed in the context of DECT and CAT-iq, it is to be understood that the applications of the present invention are not limited to those two standards only. The methods, principles and concepts described by this disclosure can be applied in equal force to any technology for (wired or wireless) communication between communication terminals and base station devices. It is to be understood that the above embodiments and their instances are provided to better illustrate different aspects of the present invention. They are in no way exhaustive of the full scope of the invention. The following disclosure teaches examples of some embodiments of the present invention in detail.

DETAILED DESCRIPTION

Figure 1:
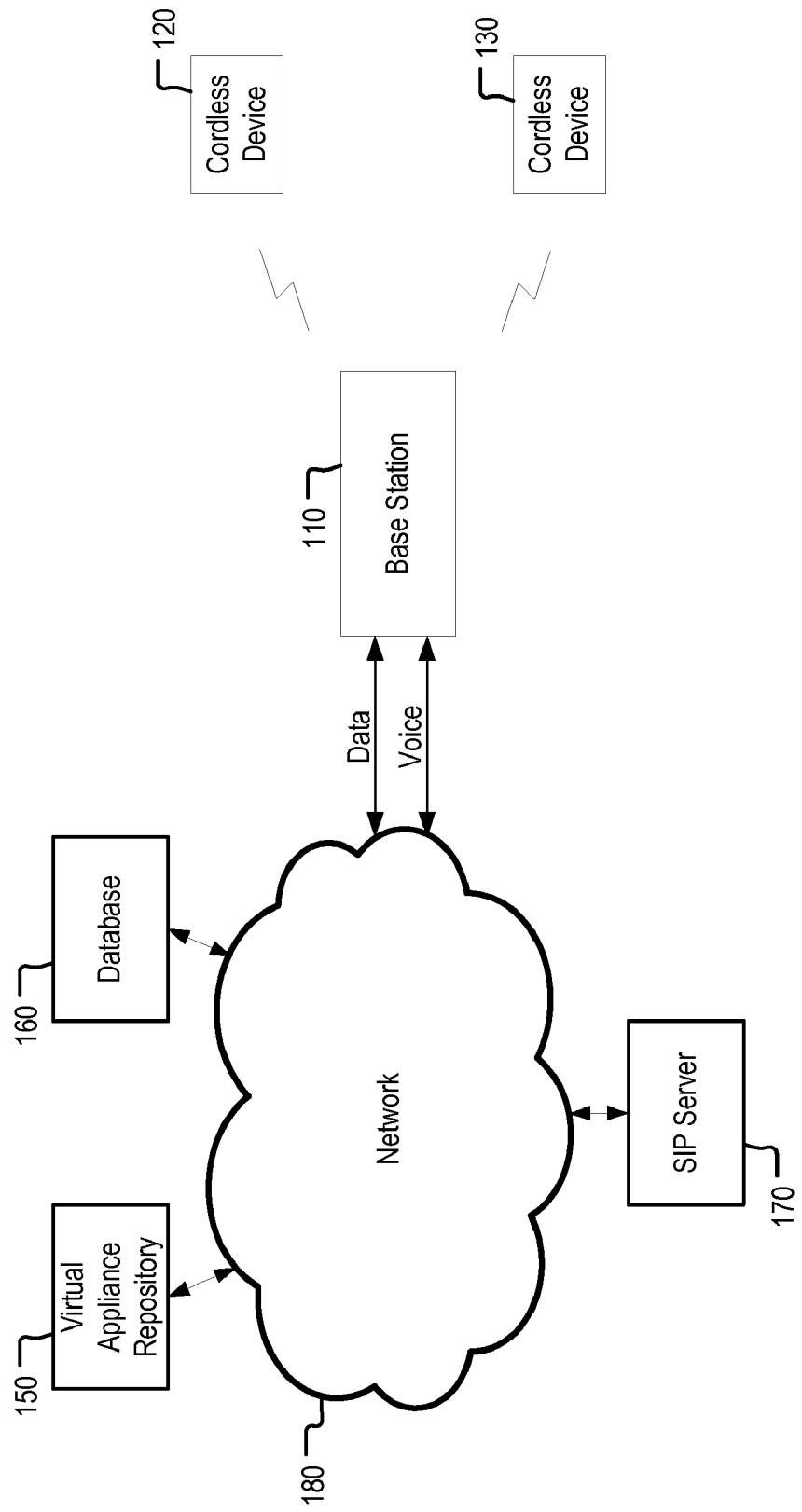
FIG. 1 depicts a schematic diagram of the salient components of the illustrative embodiment of the present invention.

FIG. 1 depicts a schematic diagram of the salient components of the illustrative embodiment of the present invention. The illustrative embodiment of the present invention comprises server 170, repository 150, database 160, network 180, base station 110, terminal 120, and terminal 130.

Server 170 is a Session Initiation Protocol Server. In accordance with the illustrative embodiment of the present invention, server 170 is a SIP registrar server. In alternative embodiments of the present invention, however, server 170 is a redirect server, proxy server, or any other type of SIP server.

Repository 150 is a server for storing virtual appliances. Repository 150 permits the searching for and retrieving of virtual appliances by base station 110. The virtual appliances in repository 150 comprise base station software that matches specific communication terminals. For instance, one virtual appliance with may contain base station software that is compatible with cordless devices that are manufactured by Avaya Inc. of Basking Ridge, N.J. while another virtual appliance may contain base station software that is better suited for communication terminals made by another manufacturer.

The virtual appliances in repository 150 comprise base station software. For the purposes of this disclosure, the term "base station software" is defined as a body of machine-executable code that enables a hardware device to operate as a base station. A hardware device is an electronic device that comprises a processor, memory, and network interface.

In some embodiments, repository 150 comprises a database that relates one or more of the virtual appliances stored in it to one or more characteristics of their base station software. That is, repository 150 permits the searching or its virtual appliances according to the characteristics of base station software that is contained in this appliance. Repository 150 allows base station 110 to search for and retrieve virtual appliances whose base station software possesses a specified characteristic. Exemplary characteristics of base station software include:

(1) service that is provided by the base station software (e.g., Internet access, voice telephony, VoIP telephony, etc.); or (2) standard version to which the base station software (e.g., DECT/CAT-iq v. 2.0, DECT/CAT-iq v. 3.0, DECT/CAT-iq v. 4.0, etc.) or (3) type of standard to which the base software conforms (e.g., DECT only, CAT-iq only, both DECT and CAT-iq (DECT/CAT-iq), etc.)

(4) detail of the implementation of a software stack that is part of the base station software (e.g., treatment of reserved bit fields, treatment of reserved values, message length, etc.); or (5) any combination of 1, 2, 3, and 4.

Database 160 is a server which executes database software. The database software stores information records which relate a Session Initiation Protocol (SIP) uniform resource identifier (URI) to an identity datum. Examples of identity data are provided in the discussion with respect to FIGS. 5-6.

Base station 110 is a DECT/CAT-iq base station. It will be clear to those skilled in the art, after reading this disclosure, how to make and use alternative embodiments of the present invention in which base station 110 uses another technology for wireless communications.

In the illustrative embodiment, base station 110 is a telephone receiver/base station combination; it is a device that doubles as a telephone receiver and a base station. In alternative embodiment of the present invention, however, base station 110 is just a base station.

Base station 110, or, more precisely, base station software 154 that executes on base station 110, provides service(s) to terminals 110 and 120. As noted, exemplary services include voice mail control, voice service capability (e.g., PSTN telephone calls), data service (e.g. Internet access), voice over Internet Protocol (VoIP), and others. A subset of the service(s) which base station 110 provide are communication services. For the purposes of this disclosure, the term "communication service" is a service that pertains to the transmission or receiving of communications by terminals 110 and/or 120. Examples of communication services include:
(1) a voice service, (which enables terminal 120 to make PSTN voice telephone calls),
(2) a text message service, (which enables terminal 120 to send text messages),
(3) a data service, (that enables terminal 120 to receive data from network 180, such as web page content, for example), and
(4) a voice over internet protocol (VoIP) service, (that enables terminal 120 to make VoIP calls)

A subset of the service(s) provided by base station are called

Terminal 120 is a handset that complies with both the CAT-iq and DECT standards. Terminal 120 connects to base station 110. In accordance with the illustrative embodiment of the present invention, base station 110 provides terminal 120 with data services. Terminal 120 uses the data services to send and receive data over network 180. It will be clear to those skilled in the art, after reading this disclosure, how to make and use alternative embodiments of the present invention in which terminal 120 is any other communication terminal (e.g., wired telephone receiver, wireless desk set telephone receiver, personal computer, cellular telephone, GSM cellular telephone, etc.).

Terminal 130, like terminal 120, is a DECT/CAT-iq compliant handset that connects to base station 110. In accordance with the illustrative embodiment of the present invention, base station 110 provides terminal 130 with data services. Terminal 130 uses the data services to send and receive data over network 180. It will be clear to those skilled in the art, after reading this disclosure, how to make and use alternative embodiments of the present invention in which terminal 130 is any other communication terminal (e.g., wired telephone receiver, wireless desk set telephone receiver, personal computer, cellular telephone, GSM cellular telephone, etc.).

Network 180 is a communications network that transports signals between base station 110, server 170, repository 150, and database 160. In accordance with the illustrative embodiment of the present invention, network 180 is a cellular network, but it will be clear to those skilled in the art, after reading this disclosure, how to make and use alternative embodiments of the present invention in which network 180 is another type of communication network (e.g. a local area network, the Public Switched Telephone Network, the Internet, wide area network, etc.).

Figure 2A:
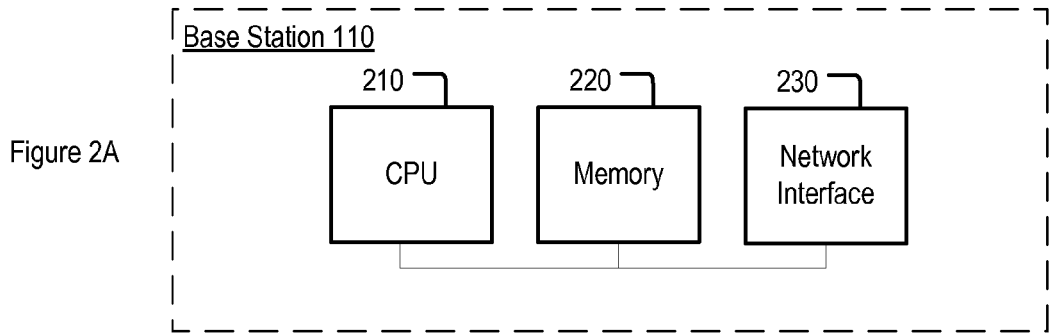
FIG. 2A depicts a schematic diagram of the salient hardware components of base station 110.

FIG. 2A depicts a schematic diagram of the salient hardware components of base station 110. Base station 110 comprises processor 210, memory 220, and network interface 230.

Processor 210 is a central processing unit (CPU) configured to execute software code. It will be clear to those skilled in the art how to make and use processor 210.

Memory 220 is a storage device that is addressable by processor 210. In accordance with the illustrative embodiment of the present invention, memory 220 is random access memory (RAM). It will be clear to those skilled in the art, after reading this disclosure, how to make and use alternative embodiments of the present invention in which memory 220 is any type of volatile or non-volatile storage device.

Network interface 230 is hardware (e.g., radio transceiver, Ethernet interface, etc.) that enables base station 110 to exchange wireless communications with terminals 120 and 130. Additionally, network interface 230 enables base station 110 to exchange communications over network 180.

Figure 2B:
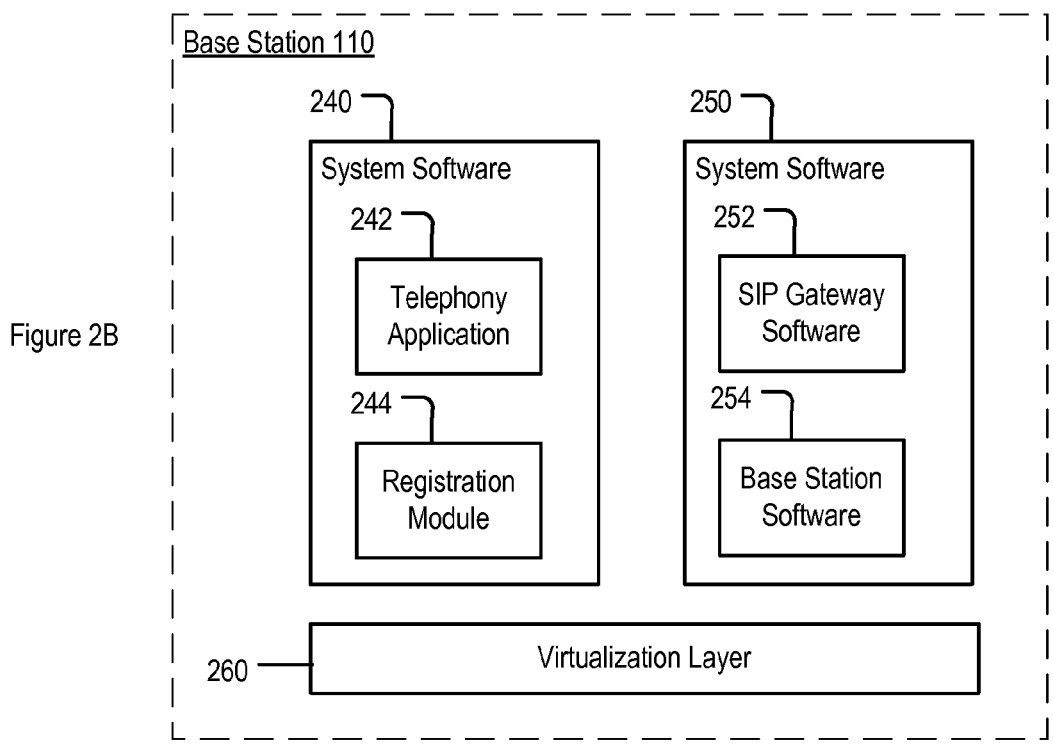
FIG. 2B depicts a schematic diagram of the salient software components of base station 110.

FIG. 2B depicts a schematic diagram of the salient software components of base station 110. Base station 110 comprises virtualization layer 260, system software 240, system software 250, telephony application 242, Session Initiation Protocol (SIP) gateway software 252, registration module 244, and base station software 254.

Virtualization Layer 260 is a software layer that facilitates the sharing of the hardware resources of base station 110 by multiple system software images. In accordance with the illustrative embodiment of the present invention, virtualization layer 260 is an OKL4 microkernel, but it will be clear to those skilled in the art, after reading this disclosure, how to make and use alternative embodiments of the present invention in which virtualization layer 260 is any other virtual machine (e.g., Type 1 hypervisor, hosted virtual machine, etc.).

System software 240 is an image of an operating system that is running on virtualization layer 260. It will be clear to those skilled in the art, after reading this disclosure, how to make and use alternative embodiments of the present invention in which system software 240 is any type of system software, firmware, or software platform that is capable of executing on top of virtualization layer 260.

Telephony application 242 is a software application for conducting telephone conversations. In the illustrative embodiment, telephony application 242 is capable of conducting voice calls. In alternative embodiments of the present invention, however, telephony application 242 is capable of conducting communication sessions in other media (e.g., video, text, etc.).

Registration module 244 is software that operates to register terminal 120 onto a Session Initiation Protocol (SIP) network. The operation of registration module 244 is further described in the discussion with respect to FIG. 6.

System software 250 is an image of an operating system that is running on virtualization layer 260. It will be clear to those skilled in the art, after reading this disclosure, how to make and use alternative embodiments of the present invention in which system software 250 is any type of system software, firmware, or software platform that is capable of executing on top of virtualization layer 260.

SIP gateway 252 is software that enables terminal 120 to direct SIP session invitations to devices in external domains (e.g., network 180, etc.). In the illustrative embodiment, SIP gateway 252 provides terminal 120 with services that are characteristic of SIP proxy servers.

Base station software 254 is the body of machine-executable code that enables base station 110 to fulfill its functions as a DECT/CAT-iq base station (i.e., base station that complies with both the CAT-iq and DECT standards). Base station software 254 is further described in the discussion with respect to FIG. 2C.

Figure 2C:
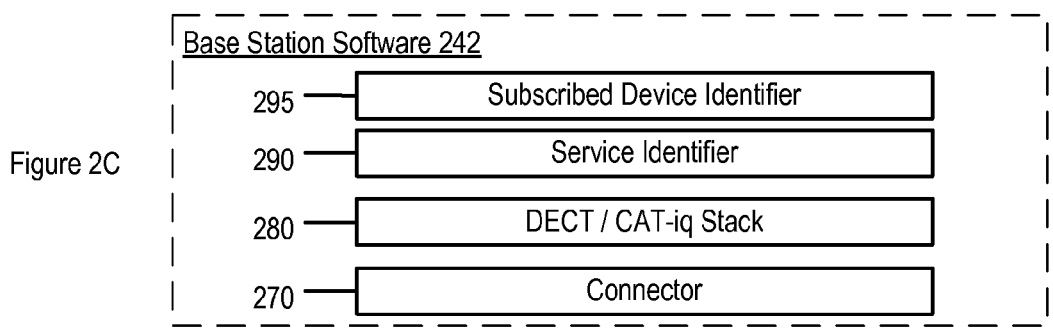
FIG. 2C depicts a schematic diagram of the salient logical components of base station software 254.

FIG. 2C depicts a schematic diagram of the salient logical components of base station software 254. In accordance with the illustrative embodiment of the present invention, base station software 254 comprises subscribed device identifier 295, service identifier 290, protocol stack 280, and connector 270.

Subscribed device identifier 295, is a set of one or more identifiers that serve to distinguish a device that is allowed to use one or more of the communication services that are provided by base station software 254 from one or more devices that are not allowed. In the illustrative embodiment, subscribed device identifier 295 is an international portable user identity (IPUI); it is an identifier assigned on a per-user basis (possibly after an authentication procedure is executed). In alternative embodiments of the present invention, however, subscribed device identifier 295 is an identifier that is assigned on a per-device basis (e.g., MAC number of terminal, international portable equipment etc (IPEI). The present invention is not limited to any specific type of subscribed device identifier.

Service identifier 290 is a set of one or more identifiers that are used to mark one or more messages that are transmitted by base station 110. Terminal 120 uses the marking to recognize the source of the messages. In some embodiments, the marking is performed by including service identifier 290 (or parts of it) inside messages that are transmitted by base station 110. It will be clear to those skilled in the art how to use service identifier 290 in a variety of ways in order to distinguish communications that are transmitted by base station 110. The present invention is not limited to any specific way of using service identifier 290 to distinguish communications by base station 110.

In the illustrative embodiment, service identifier 290 comprises a portable access rights key (PARK). It will be clear to those skilled in the art, after reading this disclosure, that alternative embodiments can be devised in which service identifier 290 is any other type of identifier. Examples of such identifiers include serial number of base station, IP address that is assigned to base station 110 for the purposes of exchanging data over network 180, number of the telephone line to which base station 110 is connected, an identifier that is assigned to base station 110 by an administrator, and others.

In summary, service identifier 290 is used by embodiments of the present invention to accomplish the following functions:

(1) distinguish base station 110 from other base station devices that are operating in the same range; or
(2) distinguish base station software 254 from other base station software instances that are executing on base station 110; or
(3) distinguish a service provided by base station software 254 from other services that are provided by base station software 254 (e.g., voice calls, data transmission, etc.); or
(4) any combination of 1, 2, and 3.

Stack 280 is an application programming interface (API) for the sending and receiving of communications. In the illustrative embodiment, stack 280 is a DECT/CAT-iq stack. Nevertheless, it will be clear to those skilled in the art, after reading this disclosure, that alternative embodiments of the present invention can be devised in which stack 280 operates according to another communication standard specification.

Stack 280 provides an application programming interface (API) for implementing a plurality of operations. The operations when combined enable different services. In the illustrative embodiment, stack 280 enables the following services:

(1) Ability to connect multiple handset devices to base station 110.
(2) Ability to make internal calls between handset devices that are subscribed with base station 110.
(3) Ability to send and receive data over network 180.
(4) Telephone book synchronization.
(5) Operation of an answering machine.

Connector 270 is software code that is responsible for establishing communication sessions between devices between communication terminals. The operation of connector 270 is further described in the discussion with respect to FIG. 8.

Figure 3A:
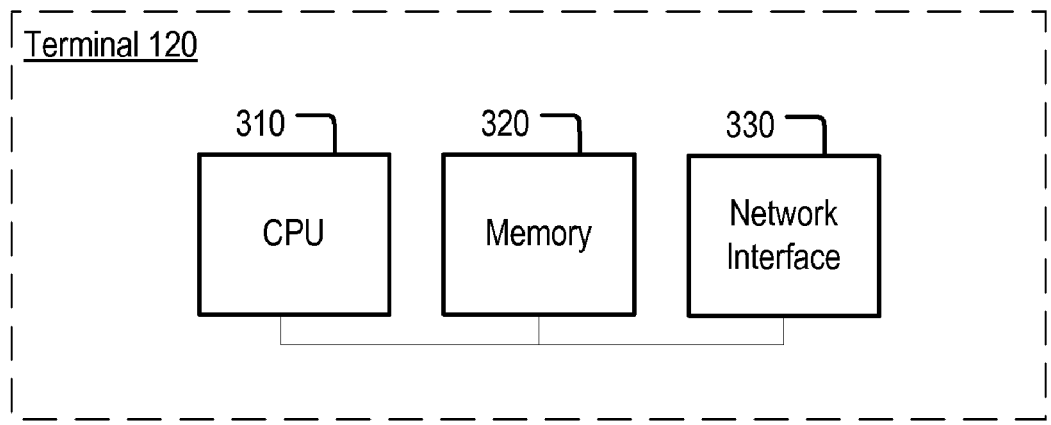
FIG. 3A depicts a schematic diagram of the salient hardware components of terminal 120.

FIG. 3A depicts a schematic diagram of the salient hardware components of terminal 120. Terminal 120 comprises processor 310, memory 320, and network interface 330.

Processor 310 is a central processing unit (CPU) configured to execute software code. It will be clear to those skilled in the art how to make and use processor 310.

Memory 320 is a storage device that is addressable by processor 310. In accordance with the illustrative embodiment of the present invention, memory 320 is random access memory (RAM). It will be clear to those skilled in the art, after reading this disclosure, how to make and use alternative embodiments of the present invention in which memory 320 is any type of volatile or non-volatile storage device.

Network interface 330 is hardware (e.g., radio transceiver, etc.) that enables terminal 120 to exchange communications with base station 110. It will be clear to those skilled in the art how to make and use network interface 330.

Figure 3B:
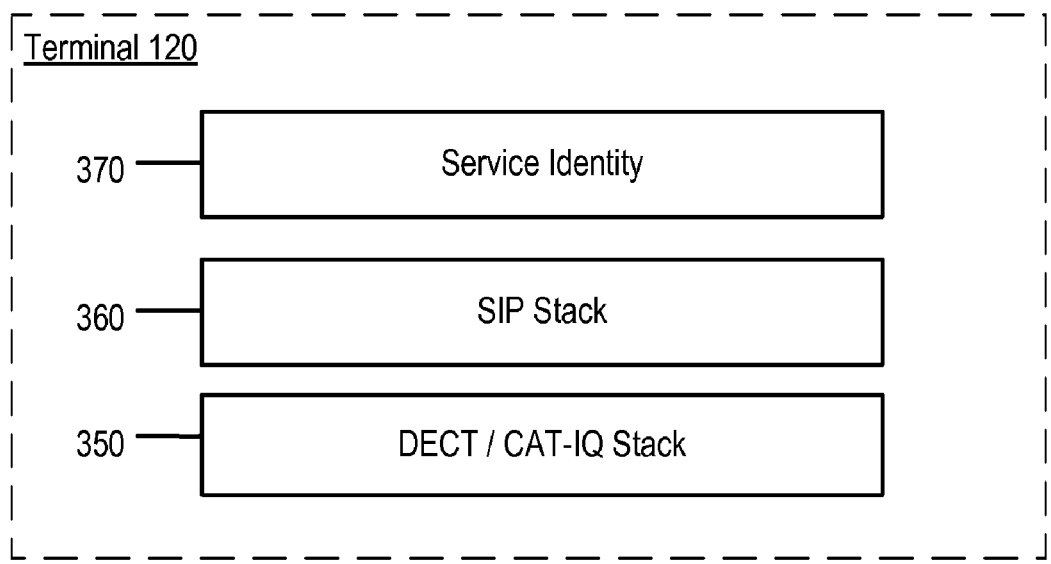
FIG. 3B depicts a schematic diagram of the salient software components of terminal 120.

FIG. 3B depicts a schematic diagram of the salient software components of terminal 120. Terminal 120 comprises stack 350, stack 360, and service identity 370.

Stack 350 is an application programming interface (API) for the sending and receiving of communications. In the illustrative embodiment, stack 350 is a DECT/CAT-iq stack. Nevertheless, it will be clear to those skilled in the art, after reading this disclosure, that alternative embodiments of the present invention can be devised in which stack 350 operates according to another communication standard specification.

Stack 350 provides applications on terminal 120 with an application programming interface (API) that enables them to access services that are made available by base station 110. For instance, it provides the necessary routines for telephony applications make telephone calls over the Public Switched Telephone Network. In the illustrative embodiment, stack 350 provides the following services:

(1) Ability to connect multiple handset devices to base station 110.
(2) Ability to make internal calls between handset devices that are subscribed with base station 110.
(3) Ability to send and receive data over network 180.
(4) Telephone book synchronization.

In order for the services provided by stack 350 to be available to the user of terminal 120, they must be also supported by stack 280. That is, a services, such as answering machine controls, is available to the user of terminal 120 only when (1) it is implemented by both stack 350 and stack 280, and (2) the implementation of stack 350 is compatible with the implementation of stack 280. Common sources of incompatibility are use of different message lengths, different treatment of reserved bit fields, different treatment of reserved values, etc.

Service identity 370 is a set of one or more identifiers that serve to identify a base station or base station service, which terminal 120 is allowed to use. In the illustrative embodiment, service identity 370 comprises a public access rights key (PARK) and an international portable user identity (IPUI). It will be clear to those skilled in the art, however, that alternative embodiments of the present invention can be devised in which service identity 370 is any type of identifier (e.g., user name, MAC address of base station 110, etc.).

Signaling protocol stack 360 is a Session Initiation Protocol (SIP) stack. It provides applications that execute on terminal 120 with an application programming interface (API) for the creating and transmitting of Session Initiation Protocol (SIP) messages. As is well known, SIP ordinarily uses data services, such as TCP and UDP for the transmission of SIP messages. In the illustrative embodiment, signaling protocol stack 360 uses data services that are provided by stack 350 (and base station 110) for the transmission of SIP messages.

In accordance with the illustrative embodiment, stack 360 is a SIP stack. Nevertheless, it will be clear to those skilled in the art, after reading this disclosure, that alternative embodiments of the present invention can be devised in which signaling protocol stack 360 is another communication protocol stack (e.g., H.323, Skype, etc.).

Figure 5:
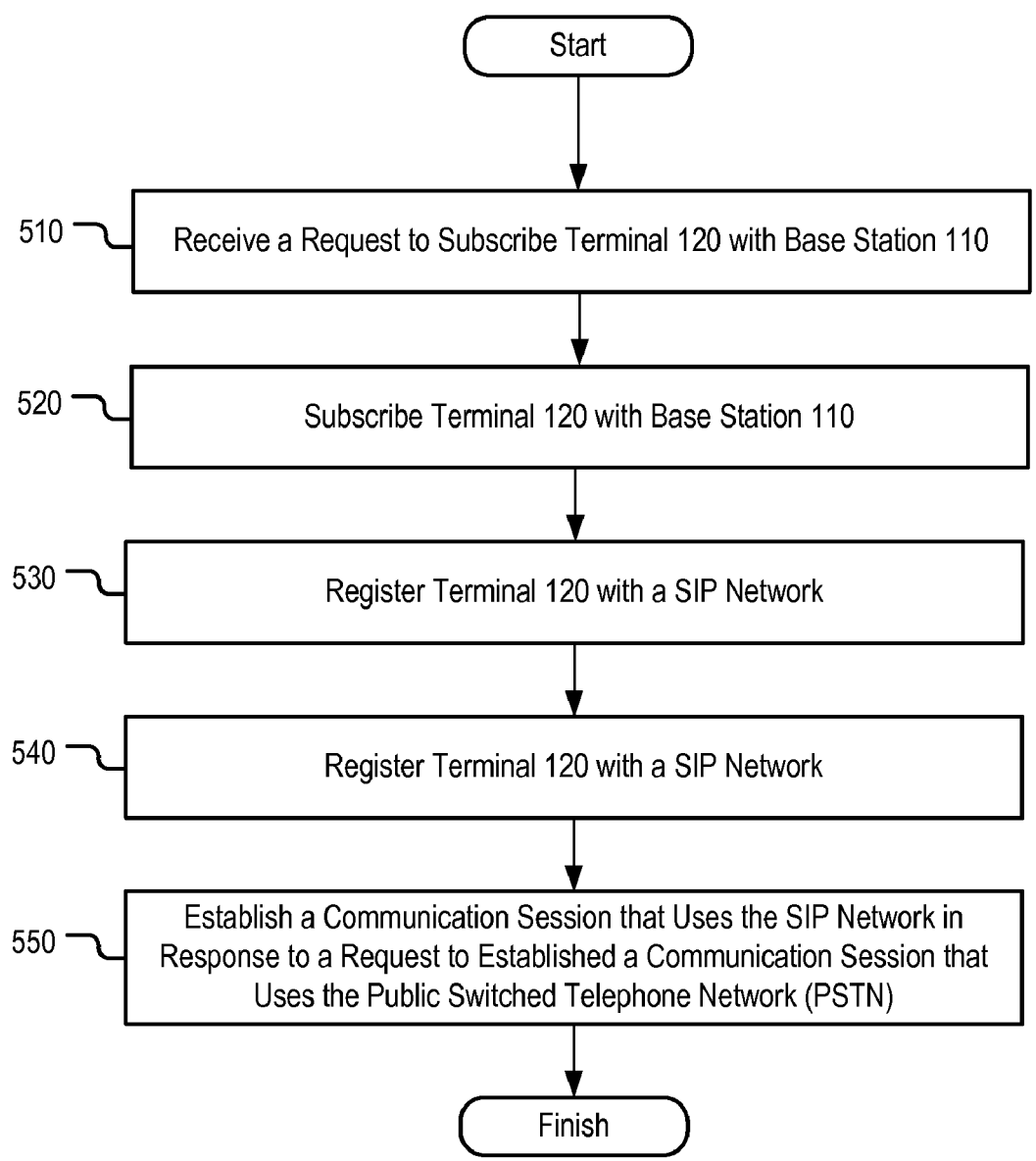
FIG. 5 depicts a flowchart of the salient tasks associated with the operation of the illustrative embodiment of the present invention.

FIG. 5 depicts a flowchart of the salient tasks associated with the operation of the illustrative embodiment of the present invention.

At task 510, registration module 244 receives a request to subscribe terminal 120 to base station 110. Subscribing terminal 120 to base station 110 enables the terminal to receive incoming communications from base station 110 as well as use base station 110 to place outgoing communications to devices that are connected to network 180. In the illustrative embodiment, the request is a LOCATE-REQUEST message. In alternative embodiments, however, the request can be any type of indication that terminal 120 is attempting to subscribe to base station 110. The LOCATE-REQUEST message contains a user identity datum which identifies the user of terminal 120.

In the illustrative embodiment, the user identity datum is an international portable user identity (IPUI). In alternative embodiments of the present invention, the identity of the user of terminal 120 is communicated to base station 110 by using another identifier (e.g., user name, password, etc.).

It will be clear to those skilled in the art, after reading this disclosure, how to make and use alternative embodiments of the present invention in which the user identity datum is not received with the subscription request. In some alternative embodiments, a procedure to obtain the user identity datum is initiated in response to receiving the subscription request (e.g., authentication handshake, etc.). In these embodiments, terminal 120 provides the user identity datum in response to a prompt from base station 110.

At task 520, registration module 244 registers terminal 120 to base station 110. When the registration is completed, terminal 120 can use base station 110 to make telephone calls, send data over network 180, and so forth. Task 520 is described in further detail in the discussion of FIG. 6.

At task 530, SIP gateway 252 registers terminal 120 on a SIP network. Task 530 is further described in the discussion with respect to FIG. 7.

At task 540, registration module 244 subscribes terminal 130 to base station 110. Also, at task 540, SIP gateway 252 registers terminal 130 on the SIP network. Task 540 is executed according to the methods and principles disclosed with respect to tasks 520-530.

In the illustrative embodiment, terminal 130 is registered with the base station software that is executing inside the user space of system software 250. In alternative embodiments however, a third system software instance is instantiated. In the alternative embodiments, terminal 130 is registered with base station software that is executing inside the user space of the third system software instance.

At task 550, base station software 254 establishes a communication session that uses the SIP network, to which terminal 120 is registered at task 120, in response to a request to establish a communication session that uses the Public Switched Telephone Network (PSTN). Task 550 is further described in the discussion with respect to FIG. 8.

Tasks 510-550 are described for illustrative purposes. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks.

Figure 6:
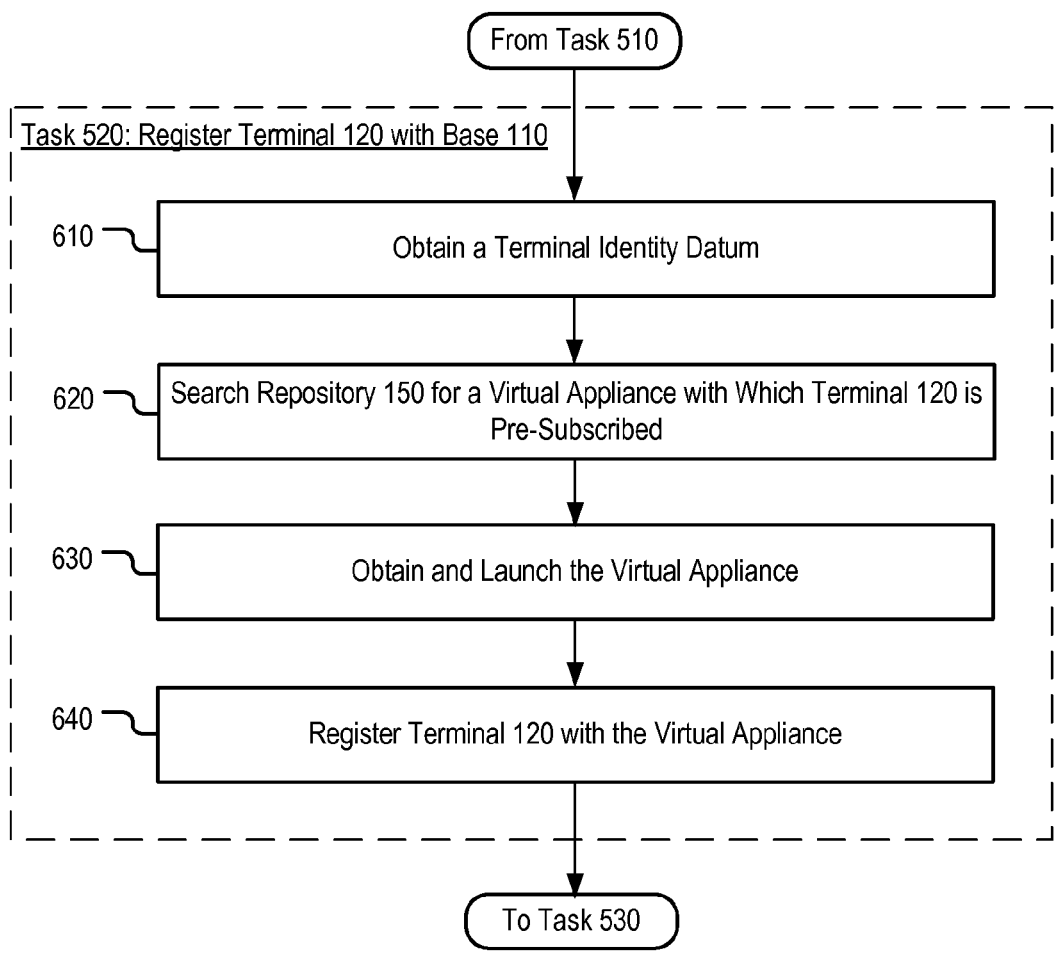
FIG. 6 depicts a schematic diagram of the salient subtasks associated with the execution of task 520.

FIG. 6 depicts a schematic diagram of the salient subtasks associated with the execution of task 520. As discussed, at task 520, terminal 120 is registered with base station 110.

At task 610, registration module 244 obtains a terminal identity datum for terminal 120. The terminal identity datum is an identifier (e.g., an alphanumerical string, etc.) that is used to distinguish terminal 120 from other terminals. In the illustrative embodiment, the terminal identity datum is based on:

(1) device identity of terminal 120, such as, for example, and without limitation, an international portable equipment identity number (IPEI), manufacturer name, model number, manufacturer serial number, etc.; or (2) identity of the user of terminal 120, such as for example and without limitation user name, password, international portable user identity (IPUI), user identity number, etc.; or (3) services that is provided by stack 350 (e.g., Internet access, voice telephony, VoIP telephony, etc.); or (4) standard version to which stack 350 conforms (e.g., DECT/CAT-iq v. 2.0, DECT/CAT-iq v. 3.0, DECT/CAT-iq v. 4.0, etc.) or (5) detail of the implementation of stack 350 (e.g., treatment of reserved bit fields, treatment of reserved values, message length, etc.); or (6) one or more identifiers that identify a base station or base station service, which terminal 120 is allowed to use (i.e., service identity 370, etc.); or (7) an identifier of a base station or service that is stored in the memory of terminal 120 prior before terminal 120 attempts to register with base station 110.

(8) an identifier of terminal 120 that is stored in the memory of terminal 120 prior before terminal 120 attempts to register with base station (8) any combination of 1, 2, 3, 4, 5, 6, 7, and 8.

In some embodiments of the present invention, a procedure to obtain the terminal identity datum is initiated in response to receiving the subscription request at task 510. In these embodiments, terminal 120 provides the terminal identity datum to base station 110 following a prompt from base station 110. In other embodiments, the terminal identity datum is received as part of the subscription request.

At task 620, registration module 244 searches and locates in repository 150 a preferred virtual appliance. The search is performed according to a search key that is based on the terminal identity datum obtained at task 610.

In the illustrative embodiment of the present invention, the preferred virtual appliance is an appliance which contains base station software with which terminal 120 is pre-subscribed. That is, the base station software of the virtual appliance is configured to be recognized by terminal 120 as a base station device (or service) with which terminal 120 is subscribed (or registered).

Terminal 120 is considered registered (or subscribed) with base station 110 when:

(1) base station 110 recognizes terminal 120 as a terminal which is allowed to access the services of base station 110 (telephony services, data services); and (2) terminal 120 recognizes base station 110 (or base station software executing on base station 110) as a base station whose service(s) the terminal is authorized to use.

Base station recognizes terminal 120 as a device which is allowed to use a service (e.g., telephony service, Internet access, etc.) provided by bases station 110 when one or more of the following is true:

(1) subscribed device identifier 295 comprises an identifier corresponding to terminal 120;

(2) subscribed device identifier 295 comprises an identifier which terminal 120 uses to identify itself to base station 110;

(3) service identifier 290 comprises an identifier which terminal 120 recognizes as the identifier for a service which terminal 120 is allowed (or registered) to use.

Terminal 120 recognizes base station 110 as a base station whose service(s) terminal 120 is allowed to use if one or more of the following is true:

(1) service identity 370 comprises an identifier that corresponds to service(s) offered by base station 110 (e.g., telephony services, Internet access, its);

(2) service identity 370 comprises an identifier which base station recognizes as an identifier of a device which is allow to access service(s) offered by base station 110.

Ordinarily, the base station will assign an identification number (IPUI, etc.) when the terminal is registered with it. After the IPUI is assigned, the base station will transmit it to the terminal. When the terminal receives the IPUI, it will store it in memory and use it to send and receive communications from the base station. The IPUI is used as a proof, by the terminal, that the terminal is allowed access services offered by the base station (e.g., make telephone calls using the PSTN, make VoIP calls, receive data, etc.).

In some embodiments of the present invention, however, terminal 120 comes with an identifier, such as the IPUI, that has been stored in the memory of terminal 120 prior to the beginning of the registration. Instead of altering the identifier that is already stored in the memory of terminal 120, or storing a new one, the present invention locates a preferred virtual appliance which contains base station software that is configured to recognize the identifier that has been stored in the memory of terminal 120 as an identifier of a device that has already been granted access rights by base station software 252. In this way, terminal 120 is subjected to a simplified registration procedure.

In the illustrative embodiment, the identification of the network that terminal 120 is allowed to access is an IPUI. The IPUI is part of the set identifier(s) that constitute service identity 370. A a virtual appliance with which terminal 120 is pre-subscribed, thus, is a virtual appliance in which the IPUI stored in the memory of terminal 120 is also part of the set of identifier(s) which constitute subscribed device identifier 295 of the base station software of the virtual appliance.

In alternative embodiments of the present invention, another type of identifier is used to identify a network (or base station, or base station service) which terminal 120 is registered with. The identifier is for example, and without limitation, a Public Access Rights Key (PARK), a MAC address, IP address, etc.

In one alternative embodiment, terminal 120 comes with a personal access registration key (PARK) stored in memory prior to the terminal beginning the registration procedure. Unlike, the IPUI, the PARK is base-station, or base station service, specific. That is, the IPUI is an identifier that is ordinarily assigned to communication terminals and the PARK is an identifier ordinarily assigned to base stations.

Terminal 120, uses the PARK to recognize messages that are associated with a base station (or base station service(s)) which the terminal is allowed to access. The PARK is contained in messages that are broadcast by base station 110. In the alternative embodiment, the base station software of the preferred virtual appliance is configured to identify itself (with one of its services) with the PARK which is pre-loaded on terminal 120. In some embodiments, the PARK is part of the set of identifiers that constitute service identifier 290.

Although in the illustrative embodiment, the preferred virtual appliance is a virtual appliances is a virtual appliance with which terminal 120 is pre-subscribed, it will be clear to those skilled in the art, after reading this disclosure, how to make and use alternative embodiments of the present invention in which the preferred virtual appliance possesses other characteristic(s). More precisely, in some alternative embodiments of the present invention, the preferred virtual appliance is a virtual appliance which comprises a communication protocol stack (i.e. stack 280) that exhibits one or more of the following characteristics:

(1) the stack in the preferred virtual appliance conforms to the same standard version as the protocol stack of a communication terminal that is being registered with base station 110 (e.g., DECT/CAT-iq v. 2.0), (2) the stack in the preferred virtual appliance enables a service that is also supported by the protocol stack of a communication terminal that is being registered with base station 110, and (3) the stack in the preferred virtual appliance exhibits an implementation characteristic (e.g., treatment of reserved bit fields, treatment of reserved values, message length, etc.) that is also found in the stack of the communication terminal that is being registered with base station 110.

At task 630, registration module 244 retrieves the preferred virtual appliance to memory 220 of base station 110.

Figure 4:
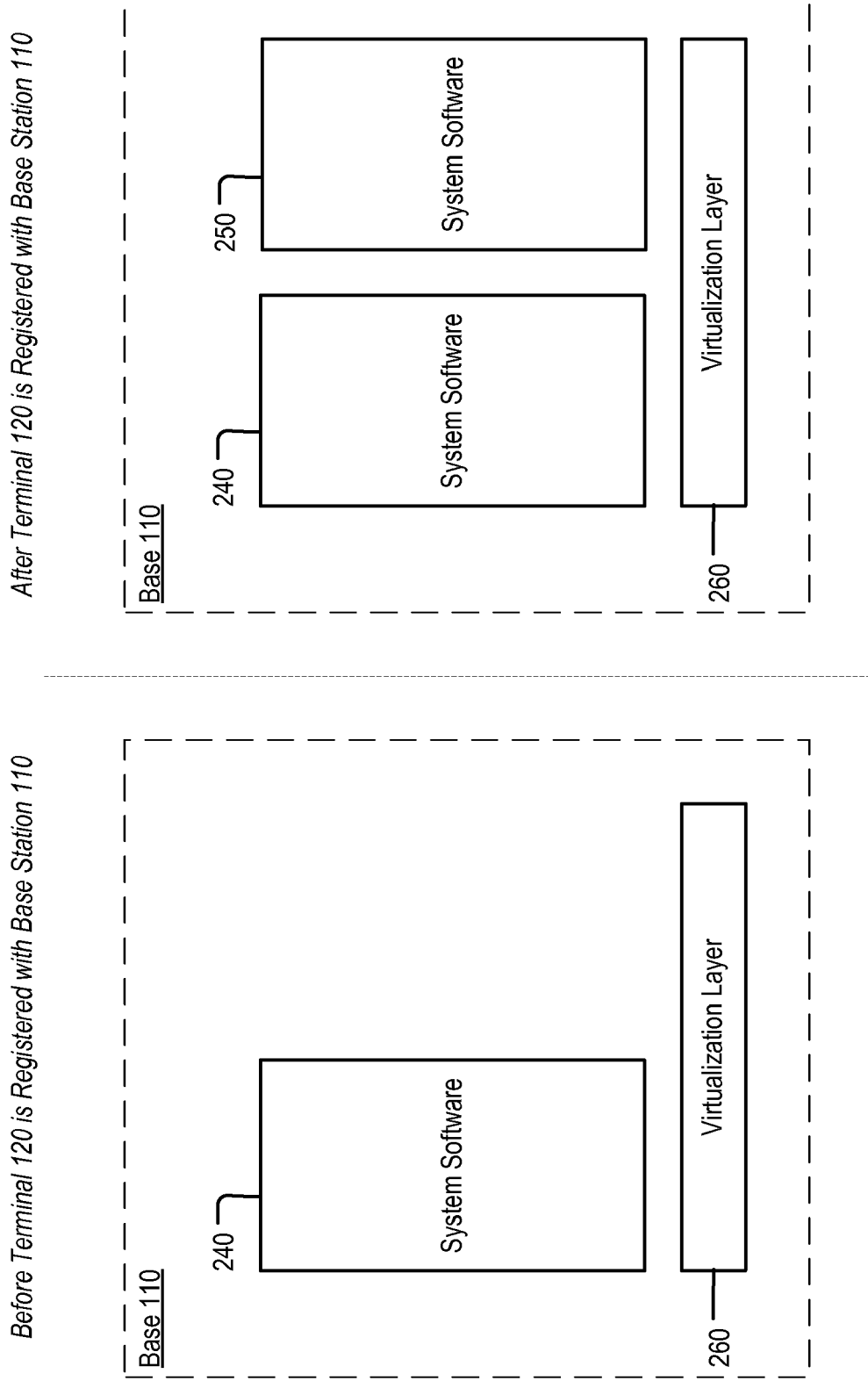
FIG. 4 depicts base station 110 before and after the execution of task 520.

At task 640, registration module 244 executes the preferred virtual appliance to instantiate system software 250. I In short, the execution of tasks 610-640 results in the location and execution of a preferred virtual appliance. FIG. 4 depicts base station 110 before and after the execution of tasks 610-640. Before the execution, only system software 240 is executing on base station 110. After the execution of tasks 610-640, two system software instances are running: system software 240 and system software 250.

Tasks 610-640 are described for illustrative purposes. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

Figure 7:
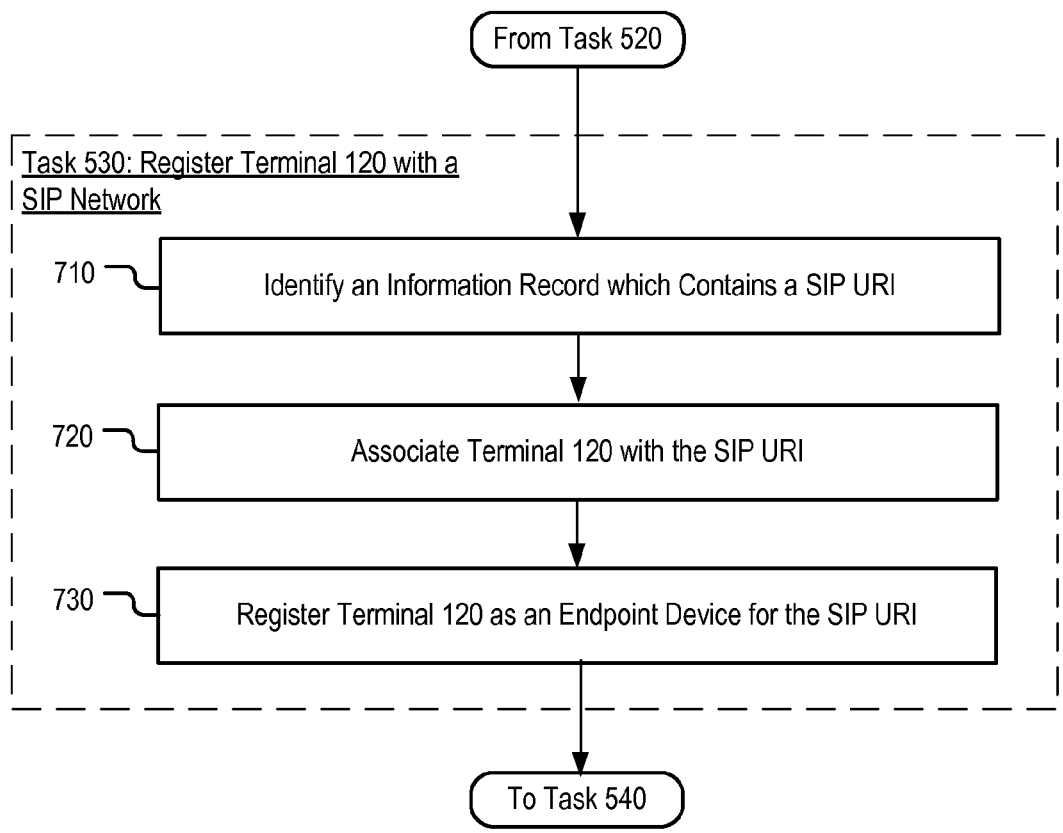
FIG. 7 depicts a flowchart of the execution of the salient sub-tasks associated with the execution of task 530.

FIG. 7 depicts a flowchart of the execution of the salient sub-tasks associated with the execution of task 530.

At task 710, registration module 244 locates an information record (e.g., user profile, etc.) which contains a Session Initiation Protocol (SIP) uniform resource identifier (URI). In the illustrative embodiment of the present invention, the record is associated with the user identity datum obtained at task 510. In an alternative embodiment of the present invention, the information record is associated with the terminal identity datum.

In the illustrative embodiment, the information record is identified by searching a database of information records with a search key that is based on the user identity datum. The database can be located on the base station 110 or it can be located a device that is external to base station 110. It will be clear to those skilled in the art how to search a database for an information record.

At task 720, registration module 244 associates the SIP URI with subscribed device identifier 295. In the illustrative embodiment, the association is performed by means of a table that relates subscribed device identities to SIP URIs. The table is stored in memory 220.

At task 730, registration module 244 registers terminal 120 as an endpoint device for the SIP URI that is contained in the record identified at task 710. The registration is completed by exchanging signaling with server 170.

In some embodiments of the present invention, base station 110 is registered as an endpoint device for the SIP URI. In these embodiments, base station 110 forwards all incoming signaling for the SIP URI to terminal 120.

Furthermore, in some embodiments of the present invention, more than one terminal from the internal network of base station 110 is associated with the same SIP URI (e.g., both terminal 120 and 130 are associated with the URI). In these embodiments, base station 110 registration module 244 registers base station 110 as an endpoint for the SIP URI while assigning local extension numbers to the different terminals.

Tasks 710-730 are described for illustrative purposes. It will be clear to those skilled in the art, after reading this disclosure, how to perform the tasks associated with FIG. 7 in a different order than represented or to perform one or more of the tasks concurrently. Furthermore, it will be clear to those skilled in the art, after reading this disclosure, how to make and use alternative embodiments of the present invention that omit one or more of the tasks.

Figure 8:
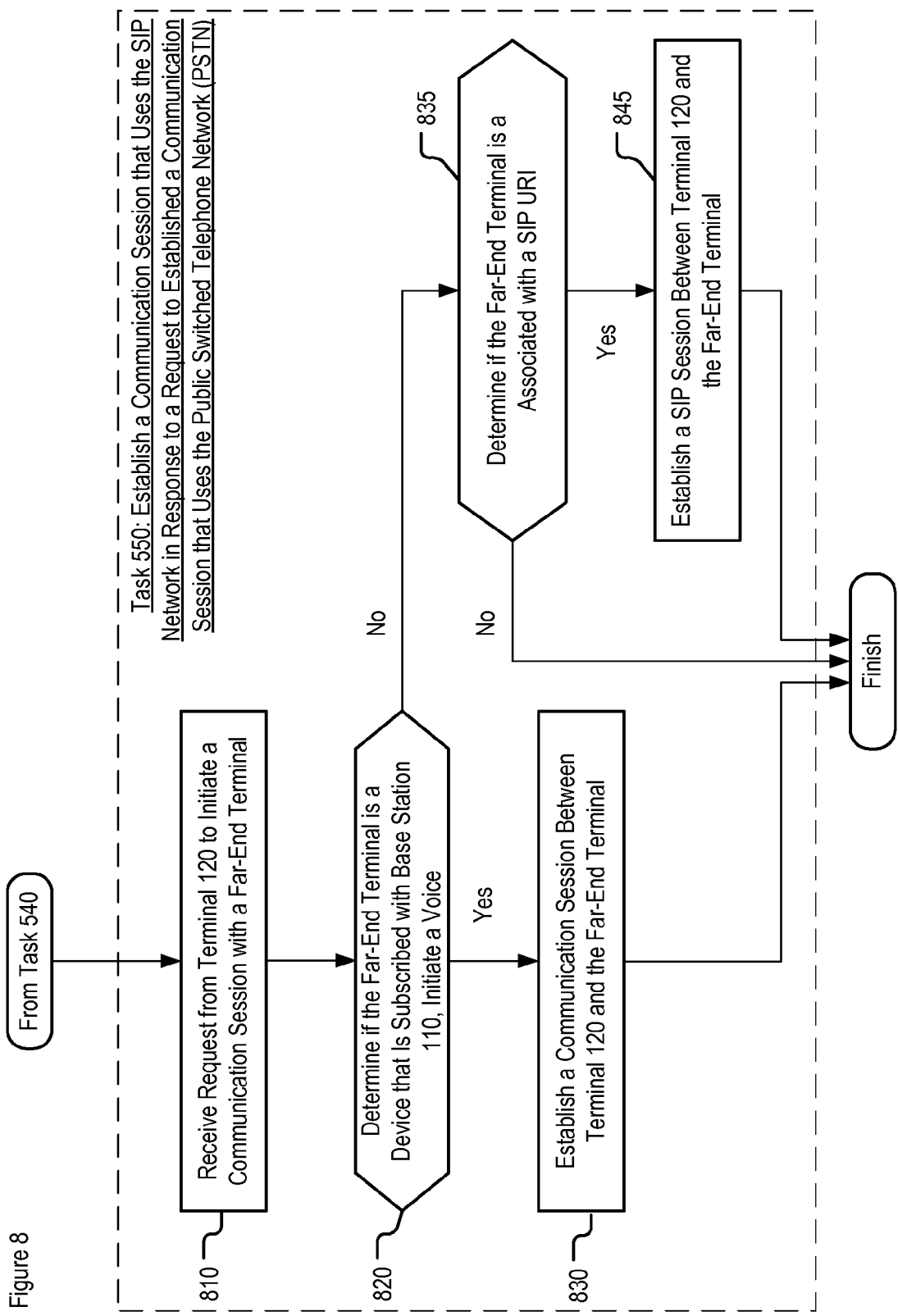
FIG. 8 depicts a flowchart of the salient sub-tasks associated with the execution of task 550.

FIG. 8 depicts a flowchart of the salient sub-tasks associated with the execution of task 550.

Terminal 120 has the capability to make two kinds of calls. It can make Public Switched Telephone Network (PSTN) calls by using the voice call service that is provided by stack 350. And it also can use stack 360 to make voice over Internet Protocol (VoIP) calls.

When a PSTN call is made, the user of terminal 120 dials a PSTN number. In response to the dialing of the PSTN number, signaling is exchanged with base station 110 instructing it to set a telephone call over the public switched telephone network (PSTN). The signaling is exchanged by using stack 350.

When a VoIP call is made, the user of terminal 120 enters a SIP URI. In response to the entering of the SIP URI, signaling protocol stack 360 exchanges SIP signaling with server 170. The SIP signaling is transmitted by using a data service that is provided by stack 360.

The illustrative embodiment, takes advantage of the capability of terminal 120 to establish both PSTN and VoIP calls to reduce the cost of calls made by terminal 120. In particular, the illustrative embodiment establishes a communication session that uses the SIP network of server 170 in response to a request to establish a call that uses the Public Switched Telephone Network (PSTN). Calls that use SIP are often less expensive than calls that use the Public Switched Telephone Network. The manner in which the present invention establishes VoIP calls is described in the discussion with respect to tasks 810-830.

At task 810, base station 110 receives from terminal 120 a request to establish a communication session with a far-end terminal. The far-end terminal is identified by at least one of a Public Switched Telephone Network (PSTN) number and a local extension number.

At task 820, connector 270 determines whether the far-end terminal is a device that is subscribed to base station 110. For instance, when the PSTN number corresponds to a telephone line terminating at base station 110, base station 110 determines that the far-end terminal is a terminal that is subscribed to base station 110. If the far-end terminal is subscribed to base station 110 (like terminal 130, for example), connector 270 proceeds to execute task 830. Otherwise, connector 270 executes task 835.

At task 830, connector 270 establishes a communication session between terminal 120 and terminal 130. Task 830 is further described in the discussion with respect to FIG. 9.

At task 835, connector 270 determines whether the far-end terminal is associated with a SIIP URI. Connector 270 searches a table that relates PSTN numbers (and/or extension numbers) to SIP URIs. When, the PSTN number of the far-end terminal is found in the table, connector 270 executes task 845.

At task 845, connector 270 establishes a communication session between terminal 120 and the far-end terminal. In the illustrative embodiment, connector 270 establishes a first RTP connection with terminal 120 and a second RTP connection with terminal 130 and bridges the two connections. In this way, media (e.g., voice, video, text, etc.) from terminal 130 is forwarded by connector 270 to terminal 120, and vice versa.

In alternative embodiments of the present invention, connector 270 establishes a the connection according to different method (e.g., establish a SIP communication session with the far end-device, and then transfer the call to terminal 110, etc.). It will be clear to those skilled in the art how to configure terminal 110 and 120 in order to be able to communicate with each other directly upon an instruction from base station 110.

Tasks 810-830 are described for illustrative purposes. It will be clear to those skilled in the art, after reading this disclosure, how to perform the tasks associated with FIG. 8 in a different order than represented or to perform one or more of the tasks concurrently. Furthermore, it will be clear to those skilled in the art, after reading this disclosure, how to make and use alternative embodiments of the present invention that omit one or more of the tasks.

Figure 9:
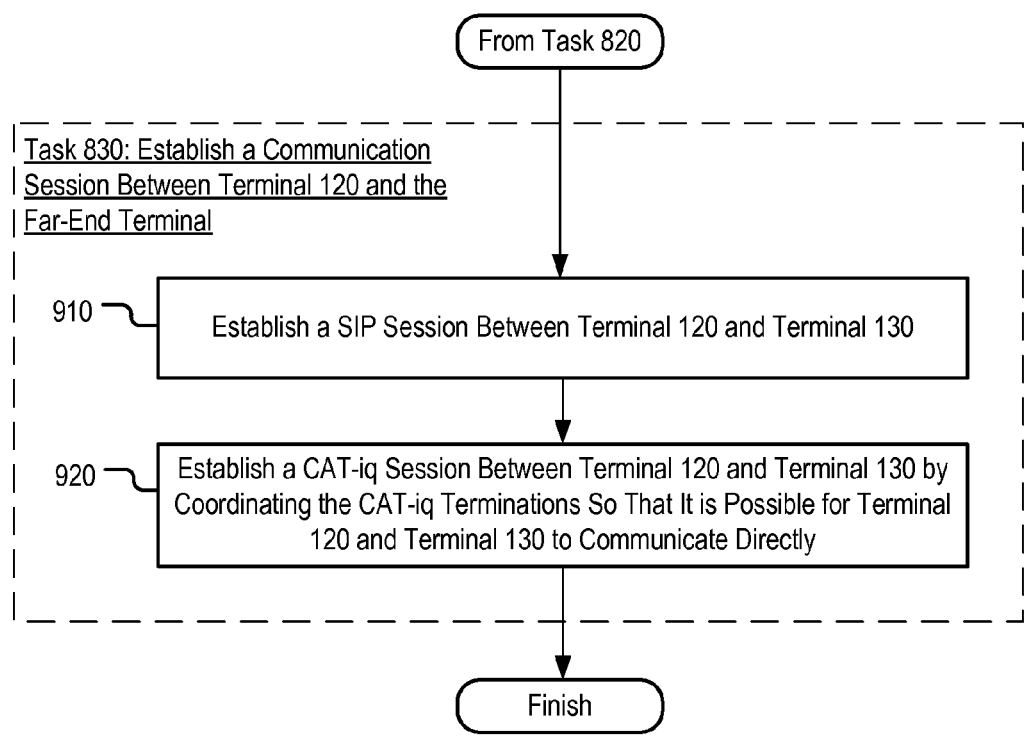
FIG. 9 depicts a flowchart of the salient sub-tasks associated with the execution of task 830.

FIG. 9 depicts a flowchart of the salient sub-tasks associated with the execution of task 830.

At task 910, connector 270 establishes a SIP communication session between terminal 120 and 130. In the illustrative embodiment, connector 270 establishes a first RTP connection with terminal 120 and a second RTP connection with terminal 130 and bridges the two connections. In this way, media (e.g., voice, video, text, etc.) from terminal 130 is forwarded by connector 270 to terminal 120, and vice versa.

In alternative embodiments of the present invention, connector 270 establishes a the connection according to different method (e.g., establish a SIP communication session with the far end-device, and then transfer the call to terminal 110, etc.). It will be clear to those skilled in the art, how to establish a SIP session between terminal 110 and the far-end terminal.

At task 920, base station 110 instructs terminal 120 and terminal 130 to establish a direct radio link with each other. It will be clear to those skilled in the art how to configure terminal 110 and 120 in order to be able to communicate with each other directly upon an instruction from base station 110.

Tasks 910-920 are described for illustrative purposes. It will be clear to those skilled in the art, after reading this disclosure, how to perform the tasks associated with FIG. 9 in a different order than represented or to perform one or more of the tasks concurrently. Furthermore, it will be clear to those skilled in the art, after reading this disclosure, how to make and use alternative embodiments of the present invention that omit one or more of the tasks.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, at a base station, a request to register a handset having an identifier that distinguishes the handset from other handsets, wherein the base station is at least one of a digital enhanced cordless telecommunications base station and a cordless advanced technology-Internet and quality base station; and
in response to the request to register the handset, selecting and starting a virtual appliance on the base station, wherein the virtual appliance is associated with a service that the handset is pre-subscribed to access, and wherein the virtual appliance recognizes the identifier as an indication that the handset is allowed to access the service.

2. The method of claim 1, wherein the base station obtains the virtual appliance by searching a virtual appliance repository, wherein the virtual appliance repository comprises a database that relates at least one virtual appliance to a characteristic of the at least one virtual appliance.

3. The method of claim 1, wherein the virtual appliance accepts the identifier as a valid credential that can be used by the handset to become authenticated with the virtual appliance.

4. The method of claim 3, wherein the identifier comprises a string stored at the handset.

5. The method of claim 1, wherein the identifier associates the base station with the service.

6. The method of claim 1, wherein the virtual appliance uses the identifier to identify the service.

7. The method of claim 1, further comprising downloading the virtual appliance prior to launching the virtual appliance on the base station.

8. A base station comprising:
a processor; and
a computer-readable storage medium having stored therein instructions which, when executed by the processor, cause the processor to perform a method comprising:
receiving a request to register a handset having an identifier that distinguishes the handset from other handsets, wherein the base station is at least one of a digital enhanced cordless telecommunications base station and a cordless advanced technology-Internet and quality base station; and
in response to the request to register the handset, selecting and starting a virtual appliance, wherein the virtual appliance is associated with a service that the handset is pre-subscribed to access, and wherein the virtual appliance recognizes the identifier as an indication that the handset is allowed to access the service.

9. The base station of claim 8, wherein the virtual appliance accepts the identifier as a valid credential that can be used by the handset to become authenticated with the virtual appliance.

10. The base station of claim 9, wherein the identifier comprises a string stored at the handset.

11. The base station of claim 8, wherein the identifier associates the base station with the service.

12. The base station of claim 8, wherein the virtual appliance uses the identifier to identify the service.

13. The base station of claim 8, wherein the computer-readable storage medium further stores instructions which result in the method further comprising downloading the virtual appliance prior to launching the virtual appliance on the base station.

14. A non-transitory computer-readable storage medium having stored therein instructions which, when executed by a processor, cause the processor to perform a method comprising:
receiving, at a base station, a request to register a handset having an identifier that distinguishes the handset from other handsets, wherein the base station is at least one of a digital enhanced cordless telecommunications base station and a cordless advanced technology-Internet and quality base station; and
in response to the request to register the handset, selecting and starting a virtual appliance on the base station, wherein the virtual appliance is associated with a service that the handset is pre-subscribed to access, and wherein the virtual appliance recognizes the identifier as an indication that the handset is allowed to access the service.

15. The non-transitory computer-readable storage medium of claim 14, wherein the base station obtains the virtual appliance by searching a virtual appliance repository, wherein the virtual appliance repository comprises a database that relates at least one virtual appliance to a characteristic of the at least one virtual appliance.

16. The non-transitory computer-readable storage medium of claim 14, wherein the virtual appliance accepts the identifier as a valid credential that can be used by the handset to become authenticated with the virtual appliance.

17. The non-transitory computer-readable storage medium of claim 16, wherein the identifier comprises a string stored at the handset.

18. The non-transitory computer-readable storage medium of claim 14, wherein the identifier associates the base station with the service.

19. The non-transitory computer-readable storage medium of claim 14, wherein the virtual appliance uses the identifier to identify the service.

20. The non-transitory computer-readable storage medium of claim 14, wherein the non-transitory computer-readable storage medium further stores instructions which result in the method further comprising downloading the virtual appliance prior to launching the virtual appliance on the base station.

* * * * *